INVENTOR
AKIRA SAWAI
BY Hopgood & Calimafde
ATTORNEYS

INVENTOR
AKIRA SAWAI
BY Hopgood & Calimafde
ATTORNEYS

United States Patent Office

3,521,274
Patented July 21, 1970

3,521,274

MULTILEVEL CODE SIGNAL TRANSMISSION SYSTEM

Akira Sawai, Tokyo, Japan, assignor to Nippon Electric Company, Limited, Tokyo-to, Japan

Filed Dec. 20, 1967, Ser. No. 692,087
Claims priority, application Japan, Dec. 29, 1966, 42/976
Int. Cl. G08c *19/28;* H04l *3/00*
U.S. Cl. 340—349 3 Claims

ABSTRACT OF THE DISCLOSURE

A multilevel code is transmitted with high transmission efficiency, a balancing of the direct-current component, and within a short time interval, by converting an $n$-digit $m$-level (or $m$-ary) input code into an $n$-digit $m+1$-level nonnegative polarity codeword and then by appropriately performing the polarity inversion of the code, where $m$ is an integer greater than two and $n$ is a positive integer.

SPECIFICATION

This invention relates to a multilevel signal transmission system and, more particularly, to a device for converting a multilevel code signal to be transmitted, into a multilevel signal having codeword suitable for repeater transmission. Specifically, the invention relates to a system for transmitting multilevel signals resorting to the conversion of an $n$-digit $m$-level (or $m$-ary) code signal to be transmitted into an $n$-digit $m+1$-ary code signal, through a repeater transmission system which is not capable of transmitting the direct-current component of the multilevel signal, where $m$ is an integer greater than two and $n$ is a positive integer.

Background of the invention

Various studies relating to repeater transmission systems for multilevel PCM signals transmitted through coaxial cables and the like have been reported. Specifically methods for eliminating the direct-current component or for balancing the code elements have been studied, and several practical methods have been proposed. An example is described in the IEEE Transactions on Communication Technology, September 1965 issue, pp. 366–372, wherein a PST (Paired Selected Ternary) code utilizing (+, −) mode is used and its direct-current component is cancelled by converting each of two successive binary digits into two ternary digits. This method of resorting to the combination of two successive digits is applicable to quaternary or more multilevel signal conversion. However, it has inherent defects in that the transmission efficiency (ratio of the virtual code transmission speed to the apparent code transmission speed) is extremely low.

Another method has been proposed in which the direct-current component is cancelled by combining the $n$ successive signal elements into a set of ternary or higher multilevel signal elements. The latter method is described in the proceedings of 1966 Joint General Meetings of Four Institutes of Electrical Engineers of Japan, vol. 4, Nos. 1670 and 1671. These methods do not, however, always fulfiill the requirements both of the elimination of the direct-current component during a short time interval, and of transmission efficiency.

Object of the invention

The object of the present invention is to provide a multilevel signal transmission system in which one more signal level is added to an $m$-aryl or $m$-level code ($m \geqq 3$) transmission device in order to eliminate the direct-current component within a short time interval without degrading the transmission efficiency.

Summary of the invention

The device of the present invention is composed of two main parts. The first part of the device has the function of generating in response to an $n$-digit $m$-ary input code an $m+1$-ary code of nonnegative polarity. The $n$-digit $m$-ary input code is at first stored in memory circuits. The code conversion is carried out for those codes whose level-sum is negative and/or extremely highly positive. In other words, each of those codes is converted into a code which has positive or zero level-sum and includes at least one more signal level (hereinafter abbreviated to "nonnegative code"). Therefore, each of the $m$-ary input code is converted into a distinct $n$-digit $m+1$-ary code having a zero or positive level-sum after passing through this first part of the device.

TABLE 1

| m \ n | 2 | | 3 | | 4 | |
|---|---|---|---|---|---|---|
| | A | B | A | B | A | B |
| 3 | 1 | 2 | 4 | 9 | 5 | 74 |
| 4 | 3 | 2 | 10 | 18 | 35 | 134 |
| 5 | 6 | 2 | 35 | 18 | 122 | 218 |
| 6 | 10 | 2 | 56 | 30 | 310 | 330 |

In Table 1, the numbers of the codes having negative level-sum to be converted are indicated in Column A and the numbers of the non-negative codes each of which includes at least one more signal level are indicated in column B. Assuming that the codes to be handled are of 3-digit 4-level including codes (−1, −1, −1), (−1, 0, 1) (0, 1, +2) etc. Among these codes, the codes having negative level sum are codes (−1, −1, −1), (−1, −1, 0), (−1, 0, −1), (0, −1, −1), (−1, 0, 0), (0, −1, 0), (0, 0, −1), (−1, −1, 1), (−1, 1, −1) and (1, −1, −1). Therefore, the number of those codes which have negative level-sum to be subjected to the code conversion of this invention is 10 as indicated in Column A. Whereas, the non-negative codes, each of which includes at least one more signal level (−2), are codes (−2, 1, 1), (1, −2, 1), (1, 1, −2), (−2, −1, 2), (−2, 2, 1), (1, −2, 2), (1, 2, −2), (2, −2, 1), (2, 1, −2), (−2, 2, 2), (2, −2, 2), (2, 2, −2), (−2, 0, 2), (−2, 2, 0), (0, −2, 2), (0, 2, −2), (2, −2, 0) and (2, 0, −2). Therefore the number of the nonnegative codes is 18 as indicated in Column B. The code conversion is possible in the range $A<B$, that is, in the range $n \geqq 2$ for $m=3$, and $n \geqq 3$ for $m=4$, and $n \geqq 4$ for $m=5$. In this embodiment, the minimum value of $n$ will be used. It will be understood from Table 1 that, for $m=5$ and $m=6$ the present invention is not applicable to the range $n \leq 3$.

The $m+1$-ary nonnegative code generated in the first part of the device is polarity-controlled in the second part. An example of the polarity control method will be illustrated, in which the polarity is controlled to attain the balance of the direct current component so that so far integrated value of the level-sum of the converted code may fall in a predetermined range. Regardless of the manner in which the polarity inversion is performed, the $m+1$-ary nonnegative code can easily be reproduced at the receiver side by merely polarity-inverting the codeword having negative level-sum, after attaining appropriate synchronization.

The above mentioned and other features and objects of this invention and the manner of attaining them will become more apparent and the invention itself will best be understood by reference to the following description of embodiments of the invention taken in conjunction with the accompanying drawings, the description of which follows.

Figure 1:
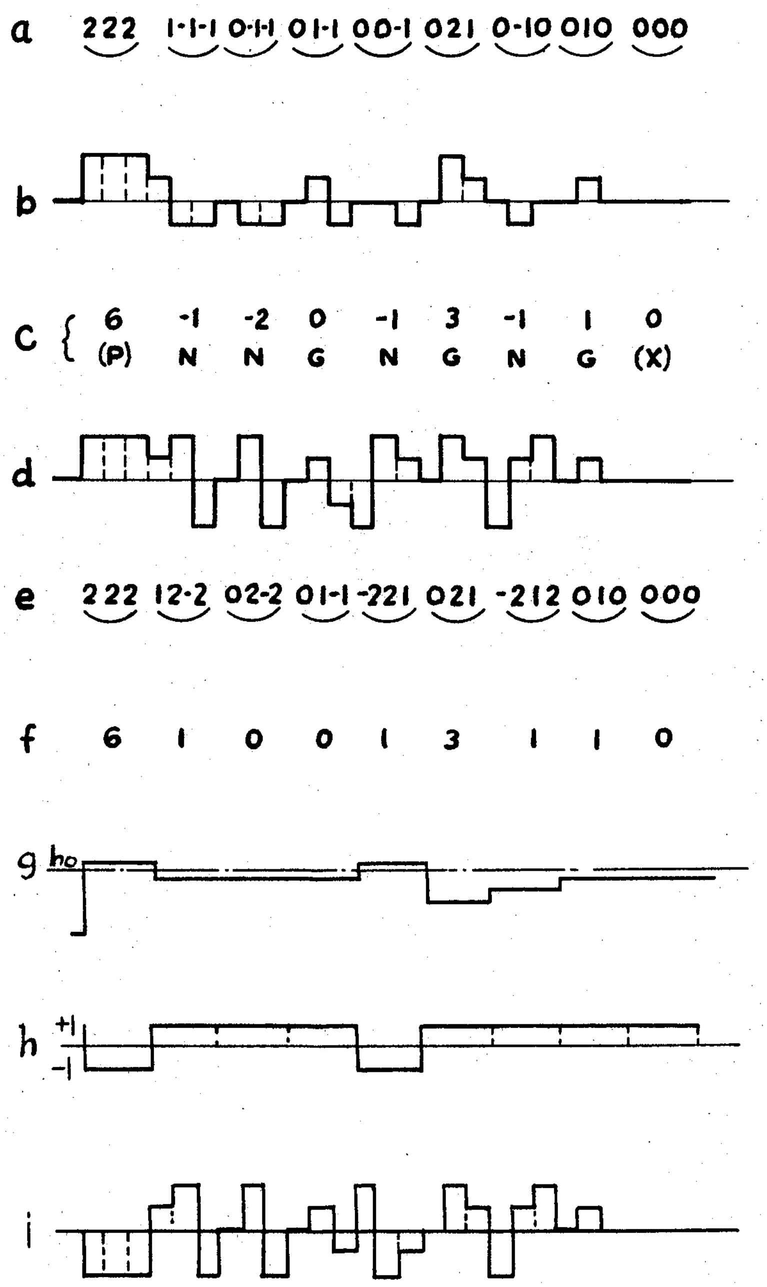
FIGS. 1*a* to 1*i* are the diagrams illustrating the conversion process of $n$-digit $m$-ary code into an $n$-digit $m+1$-*ary* direct-current-balanced code performed in the multilevel code transmission device of the present invention.

Although the present invention is applicable to a ternary or more multilevel input code, the invention will, for convenience, be described in conjunction with the case of $m=4$, $n=3$. FIGS. 1*a* and 1*b* indicate the numerals and waveforms, respectively, of an example of 3-digit, 4-level (quaternary) input code sequence $x$.

Figure 2:
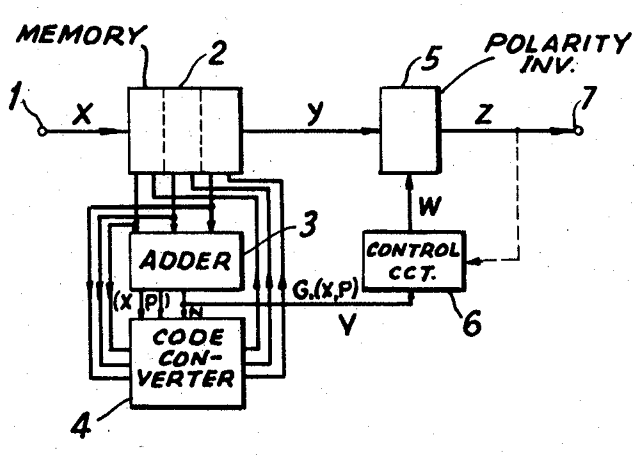
FIG. 2 is a block diagram showing an embodiment of the invention.

Upon being applied to an input terminal 1 of the embodiment of the invention shown in FIG. 2, the quaternary input waveform $x$ is converted into a nonnegative code sequence $y$ of $n=3$ and $m=4+1=5$ levels, by means of the first part of the device of the invention which includes blocks 2, 3 and 4 in FIG. 2. This process will be explained in a little more detail.

At first, every three digits of the input code sequence $a$ are stored respectively in the three-digit five-level memory circuits 2, taking one of four levels (2, 1, 0, −1) with the lowest level (−2) excluded. The memory circuit 2 is composed of, for instance, multilevel shift-register and the like. Otherwise, the circuit 2 can be composed of a combination of binary memory circuits. An adder 3 produces the summation of all the outputs of the memory circuits to generate a sequence of the level-sum shown in FIG. 1*c*. Among the symbols shown under each of the numerals of the level-sum sequence C, N corresponds to the negative value, and G, X and P to the value not concerned with the polarity inversion. The symbols X and P will be mentioned later.

When the output of the adder 3 is negative, a code converter 4 is energized to immediately replace the content of the memory circuit with a new code, which is, as mentioned above, such a code that at least one of three digits occupies the lowest level (−2) and that the level-sum of each code is positive or zero. As has been described in Table 1 where $m=4$ and $n=3$, the number of codes to be converted is 10, while the number of possible new codes is 18. Therefore, 10 codes are selected out of 18 codes corresponding to 10 codes in column A according to the correspondence rule. An example of such rule is shown in Table 2.

Table 2

| A | B′ |
|---|---|
| (−1, 0, 0) ×3 | (1, −2, 2) ×3 |
| (0, −1, −1) ×3 | (0, 2, −2) ×3 |
| (1, −1, −1) ×3 | (1, 1, −2) ×3 |
| (−1, −1, −1) ×1 | (2, −2, 2) ×1 |

The codes (−1, 0, 0), (0, −1, −1) and (1, −1, −1) in column A have the correspondence two codes respectively obtained from the permutation of each of the codes, and these nine codes are made to have one to one correspondence with the codes and their permutations in column B′. For example, the code (−1, 0, 0) corresponds to the code (1, −2, 2), the code (0, −1, 0) to (−2, 1, 2), and (0, 0, −1) to (−2, 2, 1). The code converter 4 for accomplishing these correspondence can be constructed by known logic circuits capable of discriminating the coincidence between the codes. Thus, as a result of the replacement of the content of the memory 2, the five-level nonnegative code sequence $y$ shown in FIGS. 1*d* and 1*e* is obtained. Simultaneously, a positive or zero level-sum sequence $v$ shown in FIG. 1*f* is obtained at the output of the adder 3.

The code sequence $y$ and level-sum sequence $v$ are applied to the second part of the device, which is composed of a polarity-inverter 5 and its control circuit 6. As mentioned above, this part is the circuit for inverting the polarity of the converted codes in order to eliminate the direct-current component of the code sequence; an example of the circuit is shown in FIG. 4.

Figure 4:
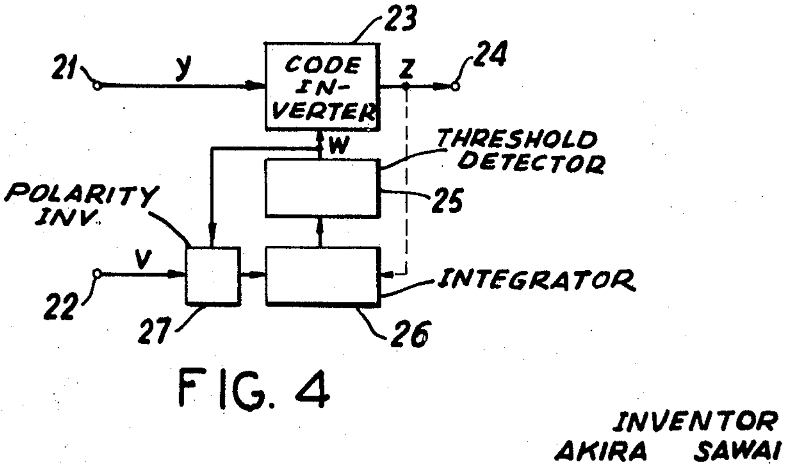
FIG. 4 is a block diagram showing an example of the circuit arrangement for polarity inversion in the device of the invention.

In FIG. 4, the multilevel nonnegative code sequence $y$ applied to a terminal 21 is polarity-inverted by a code inverter 23. The level-sum sequence $v$ applied to a terminal 22 is integrated by an integrator 26 after passing through another polarity inverter 27, the output of which is as shown in FIG. 1*g*. A threshold level detector 25 generates "+1" at its output $w$ when the output of the integrator 26 does not exceed a predetermined level $h_0$ (indicated in FIG. 1*g*), and "−1" only when it exceeds the level $h_0$. A portion of the output $w$, which is shown in FIG. 1*h*, is applied to the polarity inverter 27 so as to invert the part of the polarity of the level-sum sequence $v$ corresponding to the code which follows the level-excess detection performed in response to the sign of $w$. Another portion of the output $w$ of the threshold level detector 25 is applied to another inverter 23 to be multiplied with the code which follows the level-excess detection at the threshold detector 25 with the result that a multilevel balanced code $z$ is transmitted from the output terminal 24 in FIG. 4, that is, the output terminal 7 in FIG. 2.

Since the output of the integrator 26 may be regarded as the direct-current component of the multilevel code to be transmitted from the output terminal 24 in FIG. 4 or the output terminal 7 in FIG. 2, the output multilevel code may directly be applied to the integrator 26, as is shown by dotted line in FIG. 4. In this case, the circuits 22 and 27 are not necessary.

Figure 3:
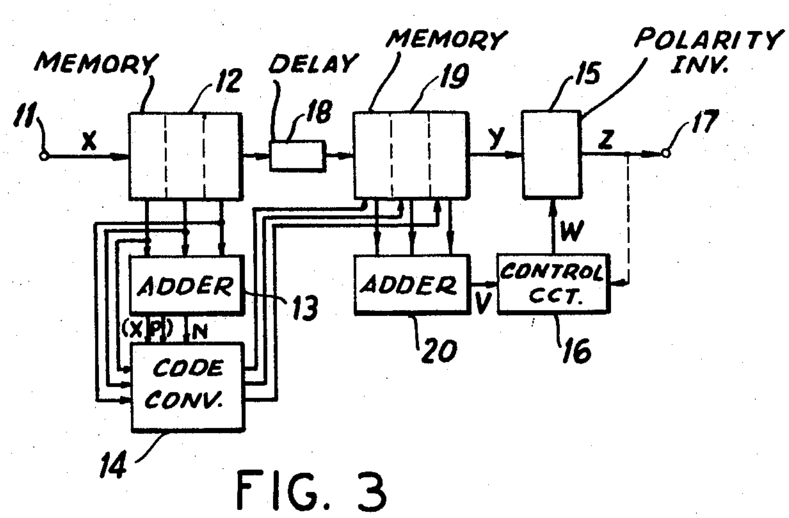
FIG. 3 is a block diagram showing an alternate embodiment of the invention.

Although only the embodiment of FIG. 2 has been explained thus far, the embodiment of FIG. 3 is also applicable to the case where the operating speed of the adder and the code converter 4 is not satisfactorily fast as compared with the input clock frequency. The blocks designated by the reference numerals 11 to 17 in FIG. 3 correspond to the reference numerals 1 to 7 in FIG. 2, while the reference numerals 18 to 20 in FIG. 3 are newly introduced. However, memory circuit 19 and an adder 20 in FIG. 3 have the same construction as the memory 12 and adder 13, respectively, except for the delay circuit 18 for delaying the output of the memory 12 by the amount equal to the delay time generated at the adder 13 and code converter 14. In this connection, it is to be noted that the memory circuit 2 and adder 3 in FIG. 2 serves dual purposes which are attained in FIG. 3 by memory circuits 12 and 19, and adders 13 and 20.

Although only a conversion of a codeword of negative polarity has been described, it is needless to say that all zero code (designated by X in FIG. 1*c*) which is not usually adopted because of the difficulty of timing in the repeater system, or a code having extremely large level-sum (for example, as is shown as P in FIG. 1*c*) and liable to cause strong intersymbol interference between the codes, can also be converted into an appropriate positive level-sum code by means of the code converter 4 or 14.

What is claimed is:

1. The method of transmitting a multilevel code with high efficiency and a balanced direct current component comprising the steps of:

converting each $n$-digit input code, each digit assuming one of $m$ levels, into an $n$-digit nonnegative polarity code, each digit assuming one of $m+1$ levels; and selectively polarity inverting said latter code; where $n$ is a positive integer and $m$ is an integer greater than two.

2. A multilevel code signal transmission system for transmitting each $n$-digit input code, each said digit assuming one of $m$ levels, in the form of an $n$-digit polarity-symmetrical and direct-current balanced code, each said digit assuming one of $m+1$ levels, where $n$ is a positive integer and $m$ is an integer greater than two, comprising:

$n$ memory circuits for memorizing each said input code at a time, each memory circuit being capable of memorizing a digit of $m+1$ levels;

an adder circuit coupled to said memory circuits for producing the level summation of the contents of said $n$ memory circuits;

a code converter coupled to said adder and said memory circuits for converting, where the output of said adder circuit is negative, the contents of said memory circuits into an $n$-digit $m+1$-level code containing at least one lowest level and its level-sum being not negative and for producing thus converted code; said memory circuits memorizing the contents of the above-mentioned $n$-digit $m+1$-level code when said code converter produces said converted code;

a polarity of inverter coupled to said memory circuits;

and a control circuit coupled to said adder circuit and said polarity inverter for controlling said polarity inverter;

said polarity inverter producing the first mentioned polarity-symmetrical and direct-current balanced code.

3. The multilevel code signal transmission system as claimed in claim 2, wherein:

said adder circuit has a first adder circuit and second adder circuit coupled to said control circuit;

said memory circuits have first $n$ memory circuits coupled to said first adder circuit for memorizing each said input code at a time, a delay circuit coupled to said first memory circuits for delaying the output of said first memory circuits by an amount equal to the delay time of said first adder circuit and said code converter, and second $n$ memory circuits coupled to said second adder circuit, said code converter, said delay circuit and said polarity inverter for memorizing the contents of the above mentioned $n$-digit $m+1$ level code when said code converter produces said converted code, and for memorizing the output of said delay circuit when said code converter does not produce said converted code; and said first adder circuit produces the level summation of the contents of said first memory circuits, and said second adder circuit products the level summation of the contents of said second memory circuits.

References Cited

UNITED STATES PATENTS

| | | | |
|---|---|---|---|
| 2,997,541 | 8/1961 | Grottrup | 178—26.5 |
| 3,055,978 | 9/1962 | Sharin et al. | 178—26.5 |
| 3,396,239 | 8/1968 | Yamauchi | 178—70 |
| 3,422,221 | 1/1969 | Sourgens | 178—26 |

THOMAS A. ROBINSON, Primary Examiner

U.S. Cl. X.R.

340—347; 35—38; 178—26